Patented Apr. 10, 1923.

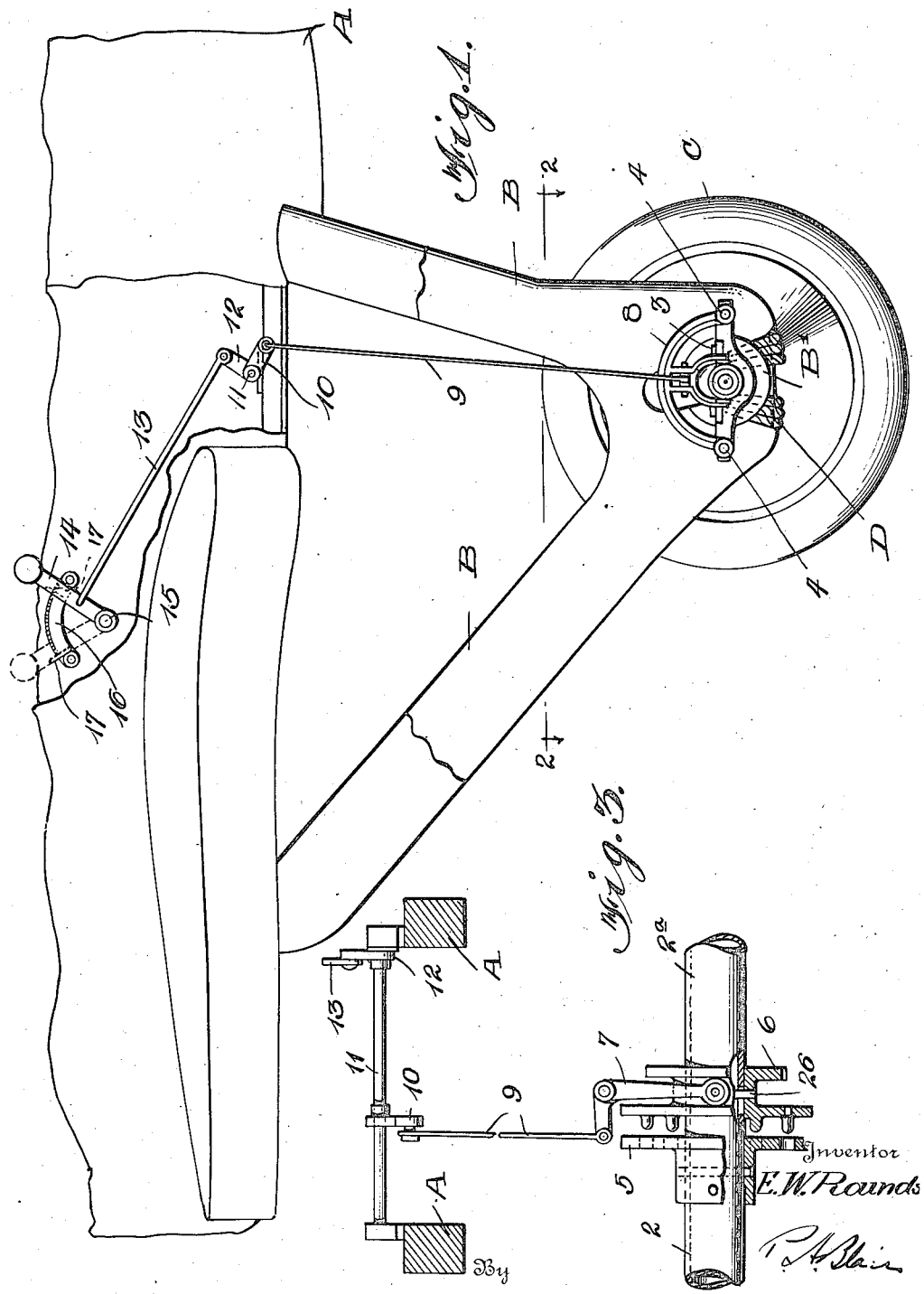

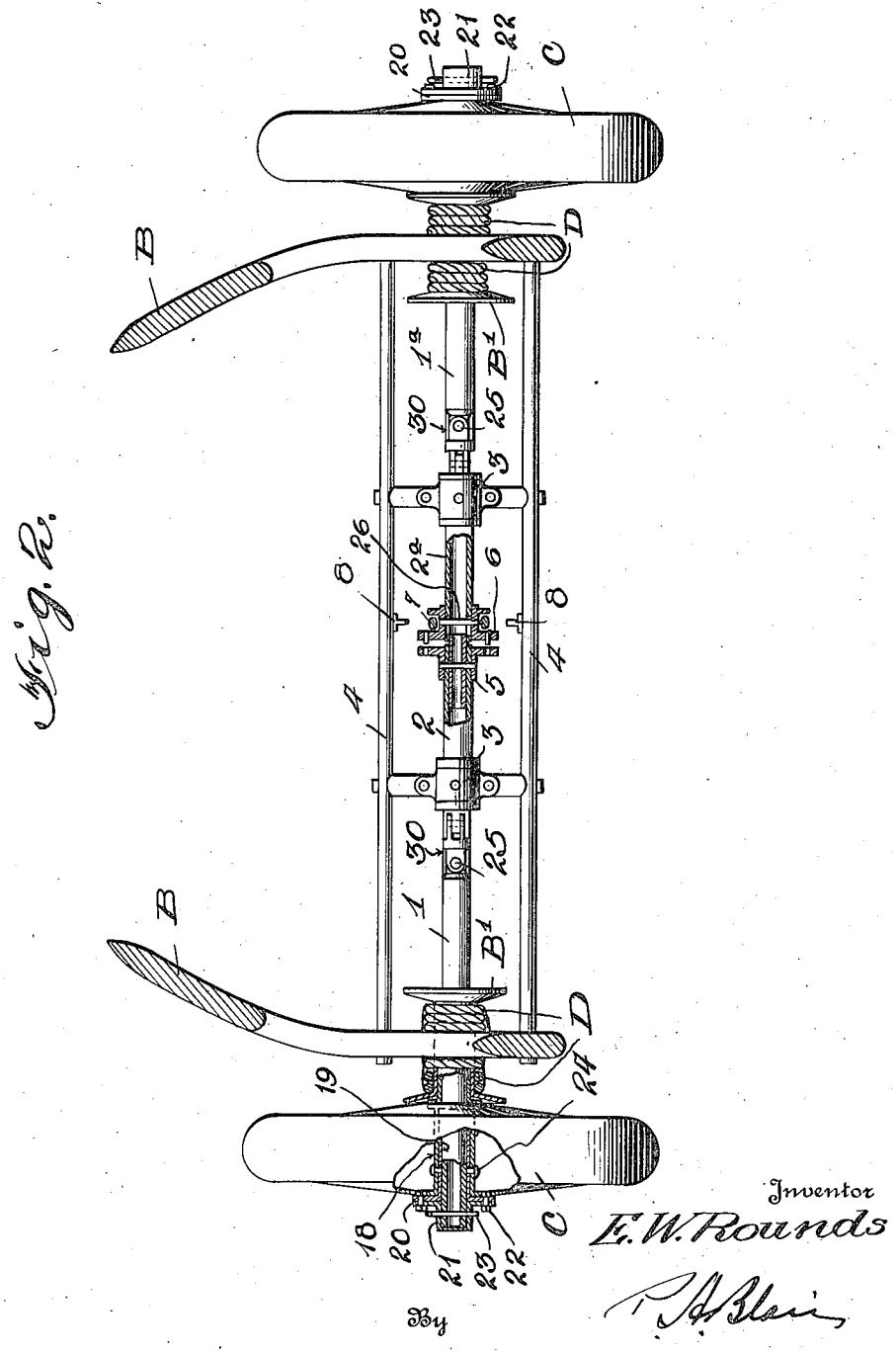

1,451,117

UNITED STATES PATENT OFFICE.

EDWARD W. ROUNDS, OF WASHINGTON, DISTRICT OF COLUMBIA.

LANDING GEAR FOR AEROPLANES.

Application filed October 24, 1921. Serial No. 510,186.

*To all whom it may concern:*

Be it known that I, EDWARD W. ROUNDS, a citizen of the United States, residing at Washington, District of Columbia, have invented new and useful Improvements in Landing Gear for Aeroplanes, of which the following is a specification.

This invention relates to improvements in aeroplanes and more particularly to the landing gear therefor.

In order that a clearer perception of the present invention may be had it may be stated that various means have been devised for launching and receiving aeroplanes of the usual land type from or on the deck of a ship. Needless to say, the deck space is limited and it is, therefore, necessary to provide means associated with the aeroplane, to bring the machine safely to rest in a relatively small space.

Such devices as means for reversing the propeller of the plane have been tested but such means is unsatisfactory inasmuch as control of the planes is lost as soon as the speed is decreased and the plane almost invariably turns to the right or left in such a way as to carry it past the available limits of the landing area.

It may be assumed, however, that if an aeroplane may be made to run straight after landing there will be little or no danger of running outside of the limits for landing. It is, therefore, the purpose of the present invention to provide an improved landing gear for aeroplanes of such simple and practical design to cause them to continue in a straight line after landing and before coming to a position of rest.

A further object is to provide a mechanism of the above character which will only very slightly increase the total weight of the machine and will not appreciably increase the total air resistance of the plane.

A further object is to provide a reliable and efficient mechanism which will be simple to operate and require no special training or ability for operation.

A further object is to provide a mechanism of the above character which will not in any way interfere with the manœuverability, military characteristics or other qualities of the plane upon which it is installed.

Other objects will be in part obvious and in part hereinafter pointed out in connection with the accompanying sheets of drawings illustrating one of various possible embodiments of the present invention, and in the several figures of which similar reference characters denote corresponding parts.

Figure 1 is a side elevation of such parts of an aeroplane equipped with the present invention as is necessary to fully understand the same.

Figure 2 is a plan view, certain parts being shown in section.

Figure 3 is a detail view, partly in section, of part of the mechanism shown in Figure 1.

Before describing the invention in detail, it is to be stated that the present device consists essentially in connecting two opposite wheels or pairs of wheels together in such a way that the right hand wheel or wheels are forced to rotate at the same angular velocity as the left hand wheel or wheels. The wheels may be connected together in any desired way, such for example, as by means of the axle to which they are fastened, by gearing or shafts driven through universal joints, or by cable and chain connections combining a clutch for throwing the wheels into and out of gear.

For easily handling the plane and in order not to strain the landing gear a clutch of any desired type is preferably provided between the wheels which may be thrown into and out of engagement by the pilot either from the cockpit or from the ground.

With this preferred embodiment in mind attention is directed to the accompanying sheets of drawings where A indicates a portion of the fuselage provided with landing struts B, and landing wheels C carried thereby, the wheels being provided with shock absorber cords D, all of which are of the usual type in aeroplane construction. The axle is preferably composed of two parts 1 and 1ª, 2 and 2ª, the parts 1 and 2 being connected by universal joint 30 and clutch mechanism 5 and 6 between the parts 2 and 2ª. Cross braces or struts 4, as shown in Figure 2, strengthen the landing gear and also provide support for bearings 3 and yoke 7 mounted upon a member 8 connecting the struts 4. The yoke 7 is used to move the movable clutch member 6 into and out of operative engagement with the fixed clutch member 5. This clutch is thrown in and out through a system of levers and links indicated by pull rod 9 connected with a lever 10 mounted upon a transverse axle 11 shown in Figure 3, which, in turn, is provided with a lever 12 connecting through link 13 to a hand lever 14. This lever is within convenient reach of the pilot of the plane being pivoted at 15 and coacting with a segment 16 having two notches 17 for holding the lever 14 in either "on" or "off" position.

The wheels C are provided with hubs 18 made fast to the axle by means of the sleeve 19, rivets 24, as well as the hub cap 21 with flange 20, bolts 22, and transverse pin 23, the universal joints 30 being fastened to the axles as shown. Likewise the clutch members 5 and 6 are secured by transverse pins 26.

The construction herein shown is operated in substantially the following manner. The plane is first taxied to a position for take-off with the clutch in disengaged position as shown in Figure 3 whereby both wheels are free to turn independently of each other. When the plane reaches its position for take-off, the clutch is preferably thrown into engagement thereby compelling the wheels to revolve together at the same angular speed and cause the plane to run in a straight line. When landing, the fact that the wheels are locked together forces them to turn at the same rate. It is desirable, of course, to have equal air pressure in both tires on the wheels and care should be taken to land as nearly as possible on both wheels at the same time in order not to require the transmision device to accelerate the wheel not touching. After the plane has come to rest the clutch is disengaged after which the plane may be taxied easily in the usual manner.

Both the landing and getaway operations are normal in every respect except that the plane is forced by the wheels to roll in a straight line.

It will thus be seen from the above that the present invention provides a simple and practical mechanism adapted to lock the wheels of the landing gear whereby the machine is compelled to run in a straight line during the landing or the getaway operations.

The construction shown may be easily and quickly applied to machines now in use without material alteration. Neither will the construction materially increase the weight or air resistance nor affect the other mechanisms and attachments.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and, therefore, such adaptations should and are intended to be comprehended within the meaning and range of equivalency of the following claims.

What I claim is:—

1. In an airplane provided with landing wheels, in combination, axles upon which the wheels are mounted, and means for connecting and disconnecting said axles whereby both wheels may be caused to rotate at the same angular velocity or allowed to rotate at different angular velocities.

2. In an aeroplane provided with landing wheels, in combination, an axle formed of a plurality of parts, clutch members associated with said parts, and means for throwing the clutch into and out of engagement at will.

3. In an aeroplane provided with landing wheels, in combination, an axle formed of a plurality of parts, clutch members associated with said parts, means for throwing the clutch into and out of engagement at will, and means operable from the pilot's seat for operating said clutch.

4. In an aeroplane provided with landing wheels, axles upon which said wheels are mounted, means for locking said wheels to the axle, and means for insuring the equal angular rotation of said wheels when desired and means for disconnecting said wheels from said axles whereby they may have a different angular rotation.

5. In an aeroplane provided with landing wheels, in combination, axles upon which said wheels are mounted, means for locking said wheels to the axle, and means for insuring the equal angular rotation of said wheels when desired and means for disconnecting said wheels from said axles whereby they may have a different angular rotation.

6. In an aeroplane provided with landing wheels, in combination, axles upon which said wheels are mounted, means for locking said wheels to the axle and means for insuring the equal angular rotation of said wheels when desired, said means comprising a clutch member and means for throwing said clutch into and out of engagement whereby the wheels may be allowed to rotate independently.

7. In an aeroplane provided with landing wheels, in combination, axles upon which said wheels are mounted, means for locking said wheels to the axle, and means for insuring the equal angular rotation of said wheels when desired, said means comprising a clutch member, means for throwing said clutch into and out of engagement, a lever operable from the pilot's seat and intervening mechanism between the lever and the clutch for actuating the latter whereby the wheels may rotate at different angular velocities.

Signed at Washington, District of Columbia, this 30th day of Sept., 1921.

EDWARD W. ROUNDS.